(12) United States Patent
Li

(10) Patent No.: US 11,552,665 B2
(45) Date of Patent: Jan. 10, 2023

(54) APPARATUS FOR SELF-GENERATING POWER WITH TWO MAGNETS AT TWO ENDS AND WIRELESS SWITCH USING SAME

(71) Applicant: CHANGZHOU CIGUANG NEW ENERGY TECHNOLOGY CO., LTD, Jiangsu (CN)

(72) Inventor: Chunguang Li, Jiangsu (CN)

(73) Assignee: Changzhou Ciguang New Energy Technology Co., Ltd., Jiangsu (CN)

( * ) Notice: Subject to any disclaimer, the term of this patent is extended or adjusted under 35 U.S.C. 154(b) by 58 days.

(21) Appl. No.: 17/381,389

(22) Filed: Jul. 21, 2021

(65) Prior Publication Data

US 2022/0140851 A1 May 5, 2022

(30) Foreign Application Priority Data

Nov. 2, 2020 (CN) .......................... 202011204173.7

(51) Int. Cl.
  *H02K 35/06* (2006.01)
  *H04B 1/16* (2006.01)
  *H01F 5/02* (2006.01)

(52) U.S. Cl.
  CPC ............. *H04B 1/1607* (2013.01); *H01F 5/02* (2013.01); *H02K 35/06* (2013.01); *H01F 2005/027* (2013.01)

(58) Field of Classification Search
  CPC .......................................... H02K 35/00–35/06
  See application file for complete search history.

(56) References Cited

FOREIGN PATENT DOCUMENTS

CN    106451993 A  *  2/2017

* cited by examiner

Primary Examiner — Ramon M Barrera
(74) Attorney, Agent, or Firm — Hunton Andrews Kurth LLP

(57) ABSTRACT

An apparatus for self-generating power with two magnets at two ends and a wireless switch using same are provides, and which belong to the field for self-generating power. The apparatus for self-generating power with two magnets at two ends of the present disclosure includes a coil assembly and a permanent magnet assembly. The permanent magnet assembly includes a left permanent magnet, a right permanent magnet and a soft magnetic frame, wherein the coil assembly includes a coil and a soft magnetic plate, and the soft magnetic plate is arranged between the left permanent magnet and the right permanent magnet in an up-down rotation manner. In an initial state, a closed magnetic circuit is defined by a left end and a right end of the soft magnetic plate and the soft magnetic frame, and when the soft magnetic plate rotates relative to the permanent magnet assembly, a closed magnetic circuit with magnetic lines of force opposite in direction is defined by the left end and the right end of the soft magnetic plate and the soft magnetic frame. The wireless switch of the present disclosure includes a radio frequency control board, a switch body used for controlling an electric device, and the apparatus for self-generating power, wherein the coil of the apparatus for self-generating power is electrically connected to the radio frequency control board.

18 Claims, 6 Drawing Sheets

APPARATUS FOR SELF-GENERATING POWER WITH TWO MAGNETS AT TWO ENDS AND WIRELESS SWITCH USING SAME

TECHNICAL FIELD

The present disclosure relates to a power generation apparatus and a wireless switch using same, in particular to an apparatus for self-generating power with two magnets at two ends and a wireless switch using same.

BACKGROUND ART

With the development of science and technology, wireless controllers have been widely used in various household appliances. Accordingly, there are some cases that wireless switches are used to control the household appliances. Existing wireless switches can be divided into battery-powered switches and self-powered (passive) wireless switches, which have brought great convenience to our daily life. However, the existing wireless switches also have some problems as follows: 1. rechargeable batteries need to be installed in the battery-powered wireless switches, and be taken out to be recharged frequently since the switches are in a state of wireless connection; as users often forget to recharge the rechargeable batteries, the appliances are misjudged as powered off when used, which causes inconvenience in use; 2. the apparatus for self-generating power of the existing wireless switch for self-generating power has a complex magnetic circuit and is inconvenient to manufacture, which increases the manufacturing cost; 3. the existing apparatus for self-generating power of the existing wireless switch for self-generating power has low power generation efficiency, weak currents and insufficient power supply, leading to unstable control over the household appliances.

SUMMARY

1. A Technical Problem to be Solved by the Present Disclosure

An objective of the present disclosure is to overcome the above shortcomings and provide an apparatus for self-generating power with two magnets at two ends and a wireless switch using same. By using a technical solution of the present disclosure, a direction of a magnetic line of force passing through a soft magnetic plate is changed by controlling the soft magnetic plate to rotate up and down relative to a permanent magnet assembly, and a coil generates power according to an electromagnetic induction principle; and since a closed magnetic circuit is formed, a magnetic flux passing through the coil is maximized, in addition, since the soft magnetic plate is located between a left permanent magnet and a right permanent magnet, and both ends of the soft magnetic plate are close to the permanent magnet, such that the soft magnetic plate is more easily magnetic-conductive, the magnetic line of force in the closed magnetic circuit may more easily pass through the soft magnetic plate, and therefore power generation efficiency is high, current is strong, and power is sufficient.

2. The Technical Solution

In order to achieve the above objective, the present disclosure provides the following technical solution:

an apparatus for self-generating power with two magnets at two ends of the present disclosure includes a coil assembly and a permanent magnet assembly, wherein the permanent magnet assembly includes a first left permanent magnet, a first right permanent magnet and a first soft magnetic frame, herein the first soft magnetic frame includes a first upper left soft magnetic plate, a first lower left soft magnetic plate, a first upper right soft magnetic plate and a first lower right soft magnetic plate, the first left permanent magnet and the first right permanent magnet are bilaterally oppositely arranged, a left end of the first upper left soft magnetic plate and a left end of the first lower left soft magnetic plate are attracted to an upper side surface and a lower side surface of the first left permanent magnet respectively, a right end of the first upper right soft magnetic plate and a right end of the first lower right soft magnetic plate are attracted to an upper side surface and a lower side surface of the first right permanent magnet respectively, and the first lower left soft magnetic plate and the first lower right soft magnetic plate are connected through a first soft magnetic base plate, wherein the first soft magnetic base plate is optionally provided with a first opening for a coil to be wound more turns;

the coil assembly includes a coil and a soft magnetic plate, wherein the soft magnetic plate is arranged between the first left permanent magnet and the first right permanent magnet in an up-down rotation manner, a left end of the soft magnetic plate is located between a right end of the first upper left soft magnetic plate and a right end of the first lower left soft magnetic plate, a right end of the soft magnetic plate is located between a left end of the first upper right soft magnetic plate and a left end of the first lower right soft magnetic plate, the coil is wound outside a middle of the soft magnetic plate, and at least one end of the left end and the right end of the soft magnetic plate is a toggle end; and in an initial state, the left end and the right end of the soft magnetic plate come into contact with the first lower left soft magnetic plate and the first upper right soft magnetic plate respectively to form a first closed magnetic circuit, when the soft magnetic plate rotates relative to the permanent magnet assembly, the left end and the right end of the soft magnetic plate come into contact with the first upper left soft magnetic plate and the first lower right soft magnetic plate to form a second closed magnetic circuit, and a direction of a magnetic line of force passing through the soft magnetic plate in the first closed magnetic circuit is opposite to that of a magnetic line of force passing through the soft magnetic plate in the second closed magnetic circuit.

Further, a contact surface between the left end of the soft magnetic plate and the first upper left soft magnetic plate and a contact surface between the right end of the soft magnetic plate and the first lower right soft magnetic plate are both arranged obliquely with left higher than right, and a contact surface between the left end of the soft magnetic plate and the first lower left soft magnetic plate and a contact surface between the right end of the soft magnetic plate and the first upper right soft magnetic plate are both arranged obliquely with left lower than right.

Further, a front side edge and a rear side edge of the first soft magnetic base plate, a front end and a rear end of the first lower left soft magnetic plate and a front end and a rear end of the first lower right soft magnetic plate are all bent upwards.

An apparatus for self-generating power with two magnets at two ends of the present disclosure includes a coil assembly and a permanent magnet assembly, wherein the permanent magnet assembly includes a second left permanent magnet, a second right permanent magnet and a second soft magnetic frame, wherein the second soft magnetic frame includes a second upper left soft magnetic plate, a second lower left soft magnetic plate, a second upper right soft magnetic plate and a second lower right soft magnetic plate, a left end of the second upper left soft magnetic plate and a left end of the second lower left soft magnetic plate are attracted to an upper side surface and a lower side surface of the second left permanent magnet respectively, a right end of the second upper right soft magnetic plate and a right end of the second lower right soft magnetic plate are connected through a first soft magnetic vertical plate, the second lower right soft magnetic plate and the second lower left soft magnetic plate are connected through a second soft magnetic base plate, and the second right permanent magnet is attracted to a lower surface of the second upper right soft magnetic plate, and a support block is arranged between each of a front end and a rear end of the second right permanent magnet and an upper surface of the second lower right soft magnetic plate; wherein the second soft magnetic base plate is optionally provided with a second opening for a coil to be wound more turns;

the coil assembly includes the coil and a soft magnetic plate, wherein the soft magnetic plate is arranged in an up-down rotation manner, a left end of the soft magnetic plate is located between a right end of the second upper left soft magnetic plate and a right end of the second lower left soft magnetic plate, a right end of the soft magnetic plate is located between the second right permanent magnet and the second lower right soft magnetic plate, the coil is wound outside a middle of the soft magnetic plate, and at least one end of the left end and the right end of the soft magnetic plate is a toggle end; and in an initial state, the left end and the right end of the soft magnetic plate come into contact with the second lower left soft magnetic plate and the second right permanent magnet respectively to form a third closed magnetic circuit, when the soft magnetic plate rotates relative to the permanent magnet assembly, the left end and the right end of the soft magnetic plate come into contact with the second upper left soft magnetic plate and the second lower right soft magnetic plate to form a fourth closed magnetic circuit, and a direction of a magnetic line of force passing through the soft magnetic plate in the third closed magnetic circuit is opposite to that of a magnetic line of force passing through the soft magnetic plate in the fourth closed magnetic circuit.

Further, a contact surface between the left end of the soft magnetic plate and the second upper left soft magnetic plate and a contact surface between the right end of the soft magnetic plate and the second lower right soft magnetic plate are both arranged obliquely with left higher than right, and a contact surface between the left end of the soft magnetic plate and the second lower left soft magnetic plate and a contact surface between the right end of the soft magnetic plate and the second right permanent magnet are both arranged obliquely with left lower than right.

An apparatus for self-generating power with two magnets at two ends of the present disclosure includes a coil assembly and a permanent magnet assembly, wherein the permanent magnet assembly includes a second left permanent magnet, a second right permanent magnet and a third soft magnetic frame, wherein the third soft magnetic frame includes a third upper left soft magnetic plate, a third lower left soft magnetic plate, a third upper right soft magnetic plate and a third lower right soft magnetic plate, a left end of the third upper left soft magnetic plate and a left end of the third lower left soft magnetic plate are attracted to an upper side surface and a lower side surface of the second left permanent magnet respectively, a rear end of the third upper right soft magnetic plate and a rear end of the third lower right soft magnetic plate are both connected to a rear end of the third lower left soft magnetic plate through a soft magnetic rear side plate arranged vertically, a front end of the third upper right soft magnetic plate and a front end of the third lower right soft magnetic plate are both connected to a front end of the third lower left soft magnetic plate through a soft magnetic front side plate arranged vertically, and the second right permanent magnet is attracted to a lower surface of the third upper right soft magnetic plate;

the coil assembly includes a coil and a soft magnetic plate, wherein the soft magnetic plate is arranged in an up-down rotation manner, a left end of the soft magnetic plate is located between a right end of the third upper left soft magnetic plate and a right end of the third lower left soft magnetic plate, a right end of the soft magnetic plate is located between the second right permanent magnet and the third lower right soft magnetic plate, the coil is wound outside a middle of the soft magnetic plate, and at least one end of the left end and the right end of the soft magnetic plate is a toggle end; and in an initial state, the left end and the right end of the soft magnetic plate come into contact with the third lower left soft magnetic plate and the second right permanent magnet respectively to form a fifth closed magnetic circuit, when the soft magnetic plate rotates relative to the permanent magnet assembly, the left end and the right end of the soft magnetic plate come into contact with the third upper left soft magnetic plate and the third lower right soft magnetic plate to form a sixth closed magnetic circuit, and a direction of a magnetic line of force passing through the soft magnetic plate in the fifth closed magnetic circuit is opposite to that of a magnetic line of force passing through the soft magnetic plate in the sixth closed magnetic circuit.

Further, a contact surface between the left end of the soft magnetic plate and the third upper left soft magnetic plate and a contact surface between the right end of the soft magnetic plate and the third lower right soft magnetic plate are both arranged obliquely with left higher than right, and a contact surface between the left end of the soft magnetic plate and the third lower left soft magnetic plate and a contact surface between the right end of the soft magnetic plate and the second right permanent magnet are both arranged obliquely with left lower than right.

Further, the permanent magnet assembly further includes a second soft magnetic vertical plate; and a left end surface of the second soft magnetic vertical plate is attracted to a right end surface of the second right permanent magnet, and a periphery of the left end surface of the second soft magnetic vertical plate separately comes into contact with a right end surface of the third upper left soft magnetic plate, a right end surface of the third lower right soft magnetic plate, a right end surface of the soft magnetic rear side plate and a right end surface of the soft magnetic front side plate.

The wireless switch of the present disclosure includes a radio frequency control board, a switch body used for controlling an electric device, and the apparatus for self-generating power described above, wherein a coil of the apparatus for self-generating power is electrically connected to the radio frequency control board.

3. Beneficial Effects

Compared with the prior art, the technical solution provided by the present disclosure has the following beneficial effects:

(1) according to the apparatus for self-generating power with two magnets at two ends of the present disclosure, the direction of the magnetic line of force passing through the soft magnetic plate is changed by controlling the soft magnetic plate to rotate up and down relative to the permanent magnet assembly, and the coil generates power according to the electromagnetic induction principle; and since the closed magnetic circuit is formed, the magnetic flux passing through the coil is maximized, power generation efficiency is high, current is strong, power generation is sufficient, and in addition, since the soft magnetic plate is located between the left permanent magnet and the right permanent magnet, and the both ends of the soft magnetic plate are close to the permanent magnet, such that the soft magnetic plate is more easily magnetic-conductive, and the magnetic line of force in the closed magnetic circuit may more easily pass through the soft magnetic plate;

(2) according to the apparatus for self-generating power with two magnets at two ends of the present disclosure, the permanent magnet assembly and the coil assembly themselves are composed of few components, and the closed magnetic circuit formed by the permanent magnet assembly and the coil assembly in cooperation is simple and quick to manufacture, thereby greatly improving production efficiency and reduces a manufacturing cost;

(3) according to the apparatus for self-generating power with two magnets at two ends of the present disclosure, the contact surface with the soft magnetic plate in the permanent magnet assembly is obliquely arranged, such that the magnetic line of force passing through the soft magnetic plate may be greatly increased, and power generation is greatly increased accordingly;

(4) according to the apparatus for self-generating power with two magnets at two ends of the present disclosure, at least one end of the left end and the right end of the soft magnetic plate is a toggle end, and one end or two ends of the soft magnetic plate may be designed as toggle ends as required, such that the soft magnetic plate may adapt to different kinds of apparatuses for self-generating power; and (5) the wireless switch of the present disclosure includes the radio frequency control board, the switch body used for controlling the electric device and the apparatus for self-generating power described above, wherein the coil of the apparatus for self-generating power is electrically connected to the radio frequency control board, and the coil in the apparatus for self-generating power generates currents to supply power to the radio frequency control board, thereby realizing passive wireless switch control.

Figure 1:
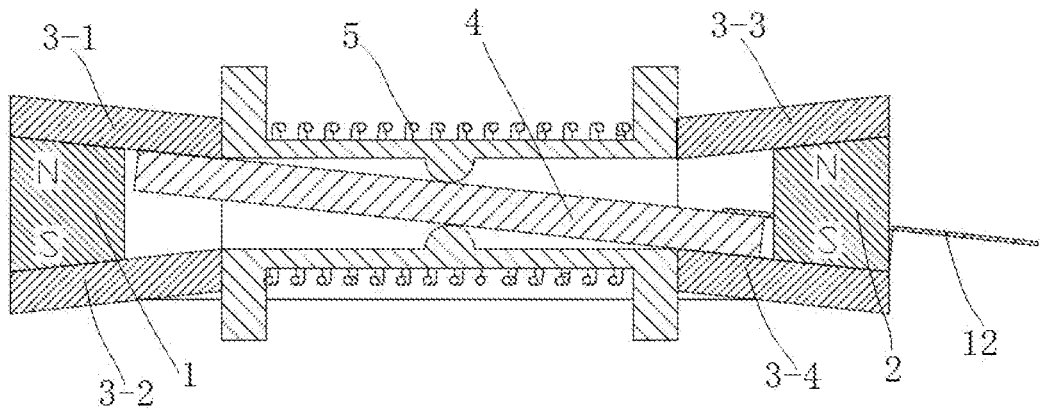
FIG. 1 is a cross-sectional view of Embodiment 1 of an apparatus for self-generating power with two magnets at two ends of the present disclosure.

Reference numerals in the schematic diagrams: 1 first left permanent magnet; 2 first right permanent magnet; 3-1 first upper left soft magnetic plate; 3-2 first lower left soft magnetic plate; 3-3 first upper right soft magnetic plate; 3-4 first lower right soft magnetic plate; 3-5 first soft magnetic base plate; 3-5-1 first opening; 4 coil; 5 soft magnetic plate; 6 second left permanent magnet; 7 second right permanent magnet; 8-1 second upper left soft magnetic plate; 8-2 second lower left soft magnetic plate; 8-3 second upper right soft magnetic plate; 8-4 second lower right soft magnetic plate; 8-5 first soft magnetic vertical plate; 8-5-1 first hole; 8-6 second soft magnetic base plate; 8-6-1 second opening; 9-1 third upper left soft magnetic plate; 9-2 third lower left soft magnetic plate; 9-3 third upper right soft magnetic plate; 9-4 third lower right soft magnetic plate; 9-5 soft magnetic rear side plate; 9-6 soft magnetic front side plate; 10 support block; 11 second soft magnetic vertical plate; and 12 flat spring.

DETAILED DESCRIPTION OF THE EMBODIMENTS

In order to further understand the content of the present disclosure, the present disclosure will be described in detail with reference to companying drawings and in conjunction with embodiments.

Embodiment 1

Figure 2:
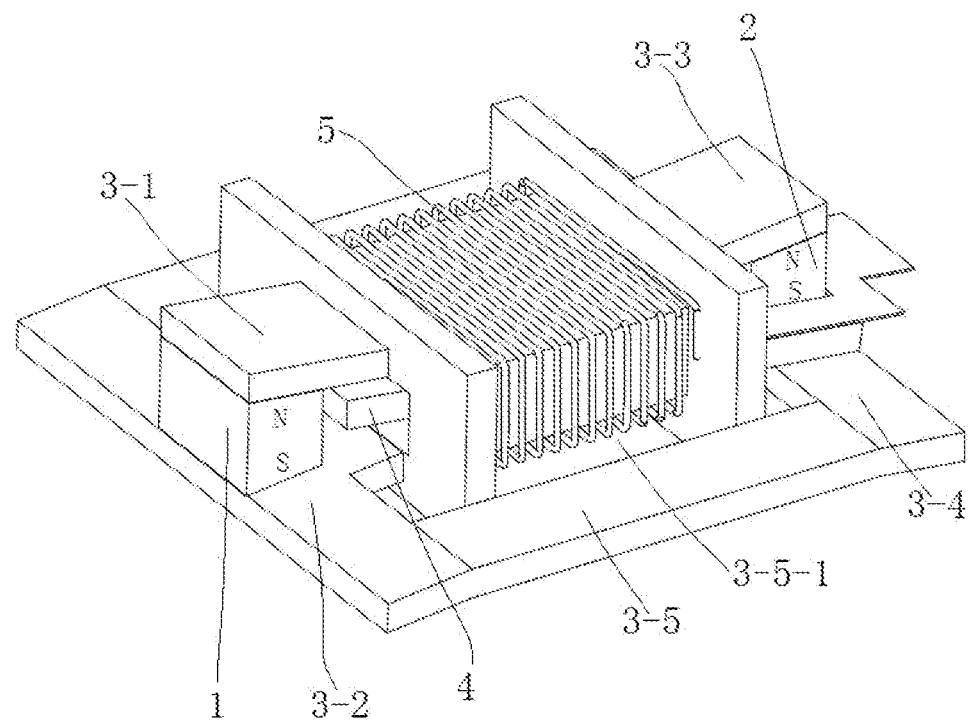
FIG. 2 is a three-dimensional diagram of Embodiment 1 of the apparatus for self-generating power with two magnets at two ends of the present disclosure.

With reference to FIG. 1 and FIG. 2, an apparatus for self-generating power with two magnets at two ends of this embodiment includes a coil assembly and a permanent magnet assembly. The permanent magnet assembly includes a first left permanent magnet 1, a first right permanent magnet 2 and a first soft magnetic frame. The first soft magnetic frame includes a first upper left soft magnetic plate 3-1, a first lower left soft magnetic plate 3-2, a first upper right soft magnetic plate 3-3 and a first lower right soft magnetic plate 3-4. The first left permanent magnet 1 and the first right permanent magnet 2 are bilaterally oppositely arranged. A left end of the first upper left soft magnetic plate 3-1 and a left end of the first lower left soft magnetic plate 3-2 are attracted to an upper side surface and a lower side surface of the first left permanent magnet 1 respectively, and a right end of the first upper right soft magnetic plate 3-3 and a right end of the first lower right soft magnetic plate 3-4 are attracted to an upper side surface and a lower side surface of the first right permanent magnet 2 respectively. The first left permanent magnet 1 and the first right permanent magnet 2 have the same polarity arrangements. The first lower left soft magnetic plate 3-2 and the first lower right soft magnetic plate 3-4 are connected through a first soft magnetic base plate 3-5.

The coil assembly includes a coil 4 and a soft magnetic plate 5. The soft magnetic plate 5 is arranged between the first left permanent magnet 1 and the first right permanent magnet 2 in an up-down rotation manner. A left end of the soft magnetic plate 5 is located between a right end of the first upper left soft magnetic plate 3-1 and a right end of the first lower left soft magnetic plate 3-2, and a right end of the soft magnetic plate 5 is located between a left end of the first upper right soft magnetic plate 3-3 and a left end of the first lower right soft magnetic plate 3-4. The coil 4 is wound outside a middle of the soft magnetic plate 5, and specifically, the coil 4 is wound on a coil winding seat. The soft magnetic plate 5 penetrates, in an up-down rotation manner, a movable cavity provided on the coil winding seat. At least one end of the left end and the right end of the soft magnetic plate 5 is a toggle end, such that the soft magnetic plate may adapt to different kinds of apparatuses for self-generating power. In this embodiment, one end of the soft magnetic plate 5 is a toggle end, and the toggle end is designed as a U-shaped structure which may sleeve the permanent magnet, so as to drive the soft magnetic plate to rotate, wherein the U-shaped structure is connected to a flat spring 12.

In an initial state, the left end and the right end of the soft magnetic plate 5 come into contact with the first lower left soft magnetic plate 3-2 and the first upper right soft magnetic plate 3-3 respectively to form a first closed magnetic circuit. Specifically, in the first closed magnetic circuit, magnetic lines of force from an N-pole of the first right permanent magnet 2 sequentially pass through the first upper right soft magnetic plate 3-3, the soft magnetic plate 5, the first lower left soft magnetic plate 3-2, the first soft magnetic base plate 3-5 and the first lower right soft magnetic plate 3-4 to converge into an S-pole of the first right permanent magnet 2. In order to increase the magnetic lines of force passing through the soft magnetic plate 5 and greatly increase power generation, a contact surface between the left end of the soft magnetic plate 5 and the first lower left soft magnetic plate 3-2 and a contact surface between the right end of the soft magnetic plate 5 and the first upper right soft magnetic plate 3-3 are both arranged obliquely with left lower than right, thereby increasing a contact area with the soft magnetic plate 5. When the soft magnetic plate 5 rotates relative to the permanent magnet assembly, the left end and the right end of the soft magnetic plate 5 come into contact with the first upper left soft magnetic plate 3-1 and the first lower right soft magnetic plate 3-4 to form a second closed magnetic circuit. Specifically, in the second closed magnetic circuit, magnetic lines of force from an N-pole of the first left permanent magnet 1 sequentially pass through the first upper left soft magnetic plate 3-1, the soft magnetic plate 5, the first lower right soft magnetic plate 3-4, the first soft magnetic base plate 3-5 and the first lower left soft magnetic plate 3-2 to converge into an S-pole of the first left permanent magnet 1. In order to increase the magnetic lines of force passing through the soft magnetic plate 5 and greatly increase power generation, a contact surface between the left end of the soft magnetic plate 5 and the first upper left soft magnetic plate 3-1 and a contact surface between the right end of the soft magnetic plate 5 and the first lower right soft magnetic plate 3-4 are both arranged obliquely with left higher than right, thereby increasing a contact area with the soft magnetic plate 5. A direction of the magnetic line of force passing through the soft magnetic plate 5 in the first closed magnetic circuit is opposite to that of the magnetic line of force passing through the soft magnetic plate 5 in the second closed magnetic circuit. The direction of the magnetic line of force passing through the soft magnetic plate 5 is changed by controlling the soft magnetic plate 5 to rotate up and down relative to the permanent magnet assembly, and the coil generates power according to an electromagnetic induction principle. Since the closed magnetic circuit is formed, the magnetic flux passing through the coil is maximized, power generation efficiency is high, current is strong, and power is sufficient. In addition, since the soft magnetic plate 5 is located between the first left permanent magnet 1 and the first right permanent magnet 2, and both ends of the soft magnetic plate 5 are close to the permanent magnet, such that the soft magnetic plate 5 is more easily magnetic-conductive, and the magnetic line of force in the closed magnetic circuit more easily passes through the soft magnetic plate 5. In addition, the permanent magnet assembly and the coil assembly themselves are composed of few components, and the closed magnetic circuit formed by the permanent magnet assembly and the coil assembly in cooperation is simple and quick to manufacture, thereby greatly improving production efficiency and reducing a manufacturing cost.

The first soft magnetic base plate 3-5 is optionally provided with a first opening 3-5-1 for the coil to be wound more turns. In this embodiment, to enable the coil to be wound more turns, the first soft magnetic base plate 3-5 is provided with the first opening 3-5-1 for the coil to be wound more turns.

Figure 3:
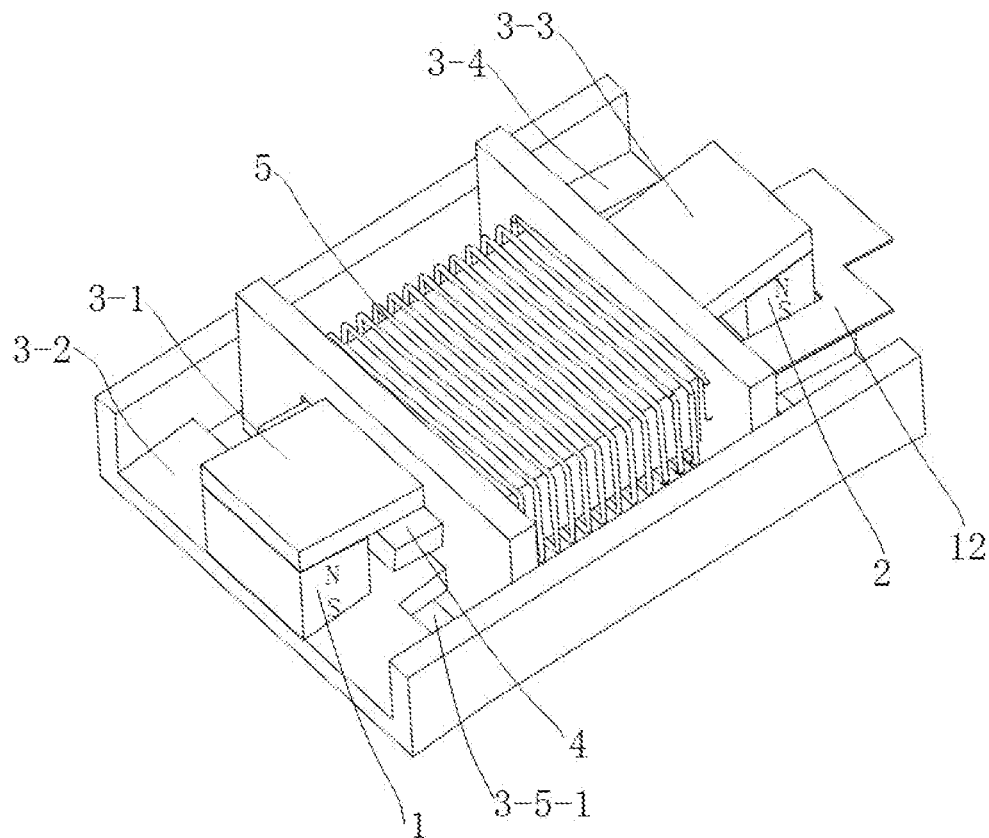
FIG. 3 is a three-dimensional diagram of Embodiment 1, with a side edge bent upwards, of the apparatus for self-generating power with two magnets at two ends of the present disclosure.

With reference to FIG. 3, in order to reduce an area occupied by the apparatus for self-generating power, a front side edge and a rear side edge of the first soft magnetic base plate 3-5, a front end and a rear end of the first lower left soft magnetic plate 3-2 and a front end and a rear end of the first lower right soft magnetic plate 3-4 are all bent upwards.

In this embodiment, for the convenience of manufacturing, the first soft magnetic base plate 3-5, the first lower left soft magnetic plate 3-2 and the first lower right soft magnetic plate 3-4 are of an integrated structure. That is, a soft magnetic plate is cut first, and then whether side edges, located on a front side and a rear side of the first opening 3-5-1, of the soft magnetic plate are bent upwards is determined as required; if not, as shown in FIG. 2, a left side edge and a right side edge of the soft magnetic plate are punched directly, so as to form the first lower left soft magnetic plate 3-2 which is arranged obliquely with left lower than right, the first lower right soft magnetic plate 3-4 which is arranged obliquely with left higher than right and the first soft magnetic base plate 3-5 which is located between the first lower left soft magnetic plate 3-2 and the first lower right soft magnetic plate 3-4; and if yes, as shown in FIG. 3, after the upward bending is successful, the left side edge and the right side of the soft magnetic plate are punched to form the first lower right soft magnetic plate 3-4 which is arranged obliquely with left higher than right, the first lower left soft magnetic plate 3-2 which is arranged obliquely with left lower than right, and the first soft magnetic base plate 3-5 which is located between the first lower left soft magnetic plate 3-2 and the first lower right soft magnetic plate 3-4. Whether the first opening 3-5-1 may be machined on the first soft magnetic base plate 3-5 is determined as required.

A wireless switch of this embodiment includes a radio frequency control board, a switch body used for controlling an electric device, and the apparatus for self-generating power described above, wherein the coil 4 of the apparatus for self-generating power is electrically connected to the radio frequency control board, and the coil in the apparatus for self-generating power generates currents to supply power to the radio frequency control board, thereby realizing passive wireless switch control.

Embodiment 2

Figure 4:
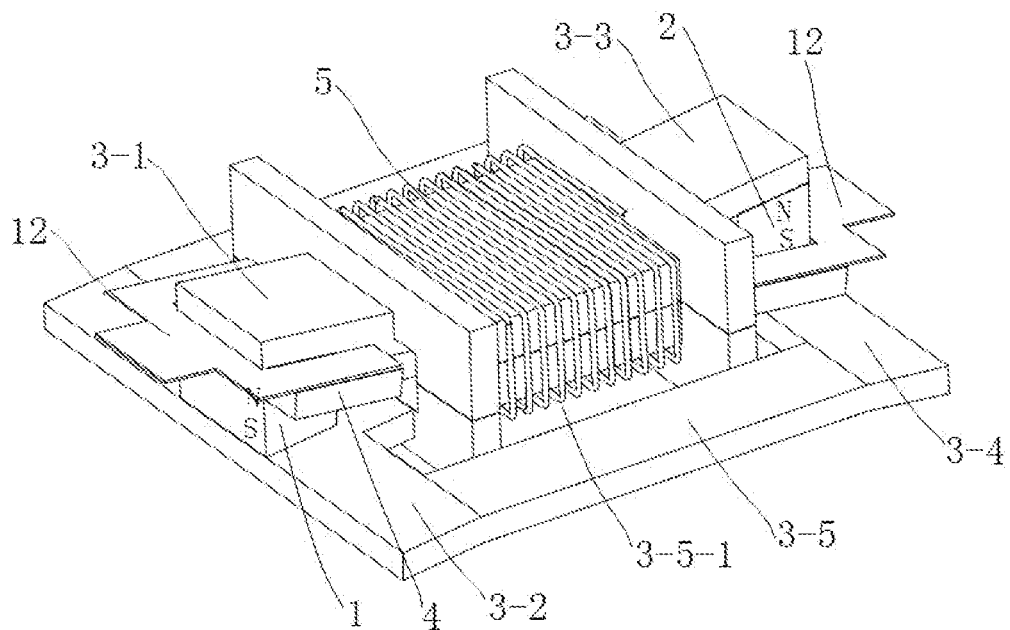
FIG. 4 is a three-dimensional diagram of Embodiment 2 of an apparatus for self-generating power with two magnets at two ends of the present disclosure.
Figure 5:
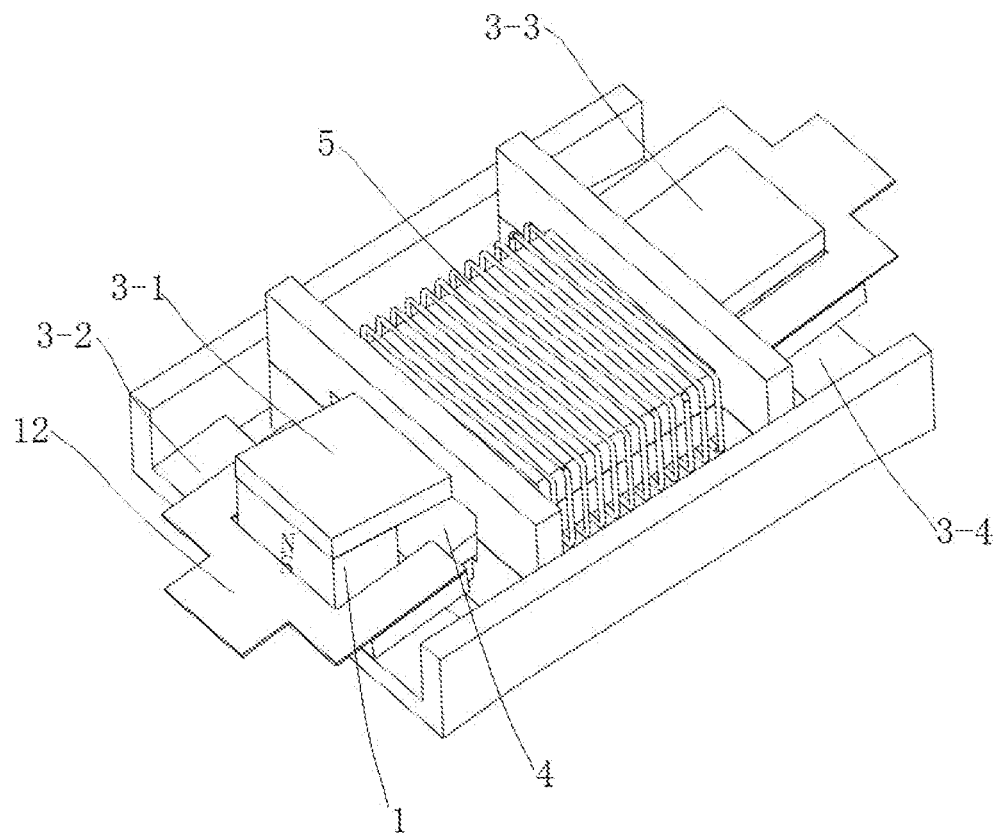
FIG. 5 is a three-dimensional diagram of Embodiment 2, with a side edge bent upwards, of the apparatus for self-generating power with two magnets at two ends of the present disclosure.

With reference to FIG. 4 and FIG. 5, a basic structure of an apparatus for self-generating power with two magnets at two ends of this embodiment is the same as that of Embodiment 1, except that both ends of a soft magnetic plate 5 are toggle ends, and the toggle end is designed as a U-shaped structure which may sleeve a permanent magnet, so as to drive the soft magnetic plate to rotate, wherein the U-shaped structure is connected to a flat spring 12.

Embodiment 3

Figure 6:
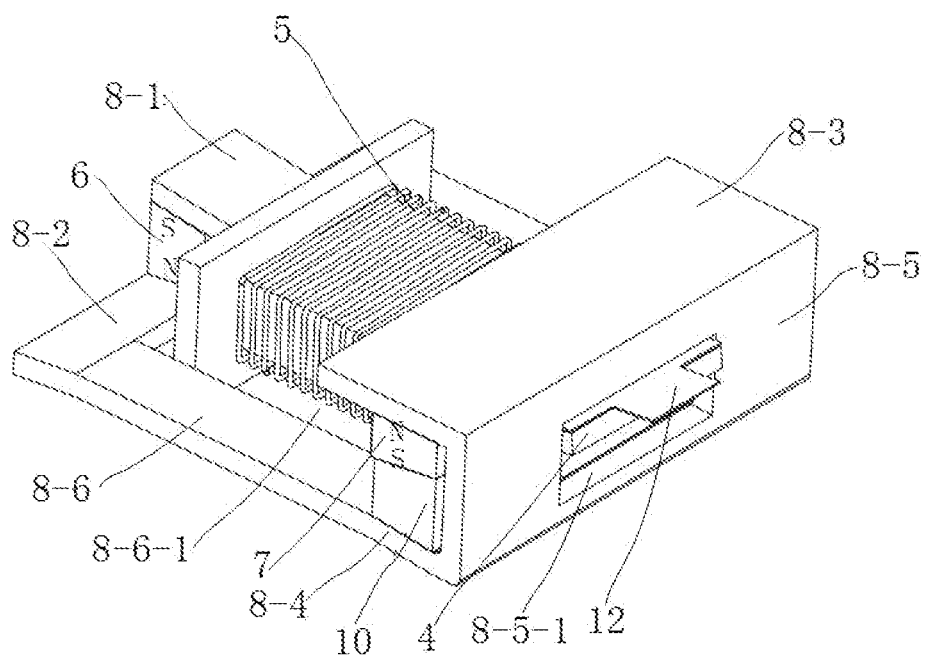
FIG. 6 is a three-dimensional diagram of Embodiment 3 of an apparatus for self-generating power with two magnets at two ends of the present disclosure.

With reference to FIG. 6, an apparatus for self-generating power with two magnets at two ends of this embodiment includes a coil assembly and a permanent magnet assembly. The permanent magnet assembly includes a second left permanent magnet 6, a second right permanent magnet 7 and a second soft magnetic frame. The second soft magnetic frame includes a second upper left soft magnetic plate 8-1, a second lower left soft magnetic plate 8-2, a second upper right soft magnetic plate 8-3 and a second lower right soft magnetic plate 8-4. A left end of the second upper left soft magnetic plate 8-1 and a left end of the second lower left soft magnetic plate 8-2 are attracted to an upper side surface and a lower side surface of the second left permanent magnet 6 respectively. A right end of the second upper right soft magnetic plate 8-3 and a right end of the second lower right soft magnetic plate 8-4 are connected through a first soft magnetic vertical plate 8-5. And the second lower right soft magnetic plate 8-4 and the second lower left soft magnetic plate 8-2 are connected through a second soft magnetic base plate 8-6. The second right permanent magnet 7 is attracted to a lower surface of the second upper right soft magnetic plate 8-3, and a support block 10 is arranged between each of a front end and a rear end of the second right permanent magnet 7 and an upper surface of the second lower right soft magnetic plate 8-4. The second right permanent magnet 7 and the second left permanent magnet 6 have opposite magnetic polarities.

The coil assembly includes a coil 4 and a soft magnetic plate 5. The soft magnetic plate 5 is arranged in an up-down rotation manner, a left end of the soft magnetic plate 5 is located between a right end of the second upper left soft magnetic plate 8-1 and a right end of the second lower left soft magnetic plate 8-2, and a right end of the soft magnetic plate 5 is located between the second right permanent magnet 7 and the second lower right soft magnetic plate 8-4. The coil 4 is wound outside a middle of the soft magnetic plate 5, and specifically, the coil 4 is wound on a coil winding seat. The soft magnetic plate 5 penetrates, in an up-down rotation manner, a movable cavity provided on the coil winding seat. At least one end of the left end and the right end of the soft magnetic plate 5 is a toggle end, such that the soft magnetic plate may adapt to different kinds of apparatuses for self-generating power. In this embodiment, the toggle end at the right end of the soft magnetic plate 5 penetrates out of a first hole 8-5-1 in the first soft magnetic vertical plate 8-5, and the toggle end of the soft magnetic plate 5 is connected to a flat spring.

In an initial state, the left end and the right end of the soft magnetic plate 5 come into contact with the second lower left soft magnetic plate 8-2 and the second right permanent magnet 7 respectively to form a third closed magnetic circuit. Specifically, in the third closed magnetic circuit, magnetic lines of force from an N-pole of the second right permanent magnet 7 sequentially pass through the second upper right soft magnetic plate 8-3, the first soft magnetic vertical plate 8-5, the second lower right soft magnetic plate 8-4, the second soft magnetic base plate 8-6, the second lower left soft magnetic plate 8-2 and the soft magnetic plate 5 to converge into an S-pole of the second right permanent magnet 7. In order to increase magnetic lines of force passing through the soft magnetic plate 5 and greatly increase power generation, a contact surface between the left end of the soft magnetic plate 5 and the second lower left soft magnetic plate 8-2 and a contact surface between the right end of the soft magnetic plate 5 and the second right permanent magnet 7 are both arranged obliquely with left lower than right, thereby increasing a contact area with the soft magnetic plate 5. When the soft magnetic plate 5 rotates relative to the permanent magnet assembly, the left end and the right end of the soft magnetic plate 5 come into contact with the second upper left soft magnetic plate 8-1 and the second lower right soft magnetic plate 8-4 to form a fourth closed magnetic circuit. Specifically, in the fourth closed magnetic circuit, magnetic lines of force from an N-pole of the second left permanent magnet 6 sequentially pass through the second lower left soft magnetic plate 8-2, the second soft magnetic base plate 8-6, the second lower right soft magnetic plate 8-4, the soft magnetic plate 5 and the second upper left soft magnetic plate 8-1 to converge into an S-pole of the second left permanent magnet 6. In order to increase magnetic lines of force passing through the soft magnetic plate 5 and greatly increase power generation, a contact surface between the left end of the soft magnetic plate 5 and the second upper left soft magnetic plate 8-1 and a contact surface between the right end of the soft magnetic plate 5 and the second lower right soft magnetic plate 8-4 are both arranged obliquely with left higher than right, thereby increasing a contact area with the soft magnetic plate 5. A direction of the magnetic line of force passing through the soft magnetic plate 5 in the third closed magnetic circuit is opposite to that of the magnetic line of force passing through the soft magnetic plate 5 in the fourth closed magnetic circuit. The direction of the magnetic line of force passing through the soft magnetic plate 5 is changed by controlling the soft magnetic plate 5 to rotate up and down relative to the permanent magnet assembly, and the coil generates power according to an electromagnetic induction principle. Since the closed magnetic circuit is formed, the magnetic flux passing through the coil is maximized, power generation efficiency is high, current is strong, and power is sufficient. In addition, since the soft magnetic plate 5 is located between the second left permanent magnet 6 and the second right permanent magnet 7, and the both ends of the soft magnetic plate 5 are close to the permanent magnet, such that the soft magnetic plate 5 is more easily magnetic-conductive, and the magnetic line of force in the closed magnetic circuit more easily passes through the soft magnetic plate 5. In addition, the permanent magnet assembly and the coil assembly themselves are composed of few components, and the closed magnetic circuit formed by the permanent magnet assembly and the coil assembly in cooperation is simple and quick to manufacture, thereby greatly improving production efficiency and reduces a manufacturing cost.

The second soft magnetic base plate 8-6 is optionally provided with a second opening 8-6-1 for the coil 4 to be wound more turns. In this embodiment, to enable the coil to be wound more turns, the second soft magnetic base plate 8-6 is provided with the second opening 8-6-1 for the coil to be wound more turns.

In this embodiment, for the convenience of manufacturing, the second lower left soft magnetic plate 8-2, the second soft magnetic base plate 8-6, the second lower right soft magnetic plate 8-4, the first soft magnetic vertical plate 8-5 and the second upper right soft magnetic plate 8-3 are of an integrated structure. That is, a soft magnetic plate is cut first, then a left side edge of the soft magnetic plate is punched to form the second lower left soft magnetic plate 8-2 which is arranged obliquely with left lower than right, then a right side edge of the soft magnetic plate is punched first to form the second lower right soft magnetic plate 8-4 which is arranged obliquely with left higher than right, the right end of the second lower right soft magnetic plate 8-4 is bent upwards to form the first soft magnetic vertical plate 8-5, and finally an upper end of the first soft magnetic vertical plate 8-5 is bend leftwards to form the second upper right soft magnetic plate 8-3. Whether the second opening 8-6-1 may be machined on the second soft magnetic base plate 8-6 between the second lower left soft magnetic plate 8-2 and the second lower right soft magnetic plate 8-4 is determined as required.

A wireless switch of this embodiment includes a radio frequency control board, a switch body used for controlling an electric device, and the apparatus for self-generating power described above, wherein the coil 4 of the apparatus for self-generating power is electrically connected to the radio frequency control board, and the coil in the apparatus for self-generating power generates currents to supply power to the radio frequency control board, thereby realizing passive wireless switch control.

Embodiment 4

Figure 7:
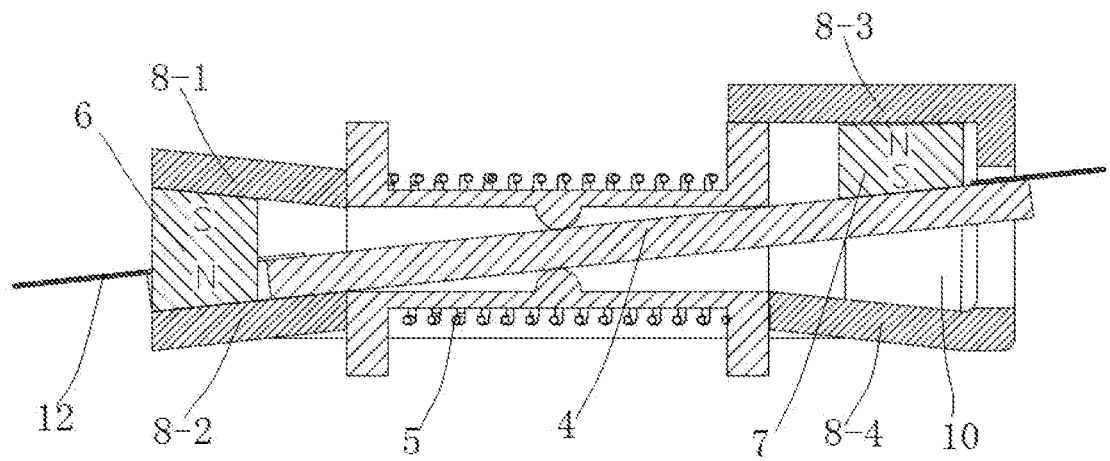
FIG. 7 is a cross-sectional view of Embodiment 4 of an apparatus for self-generating power with two magnets at two ends of the present disclosure.
Figure 8:
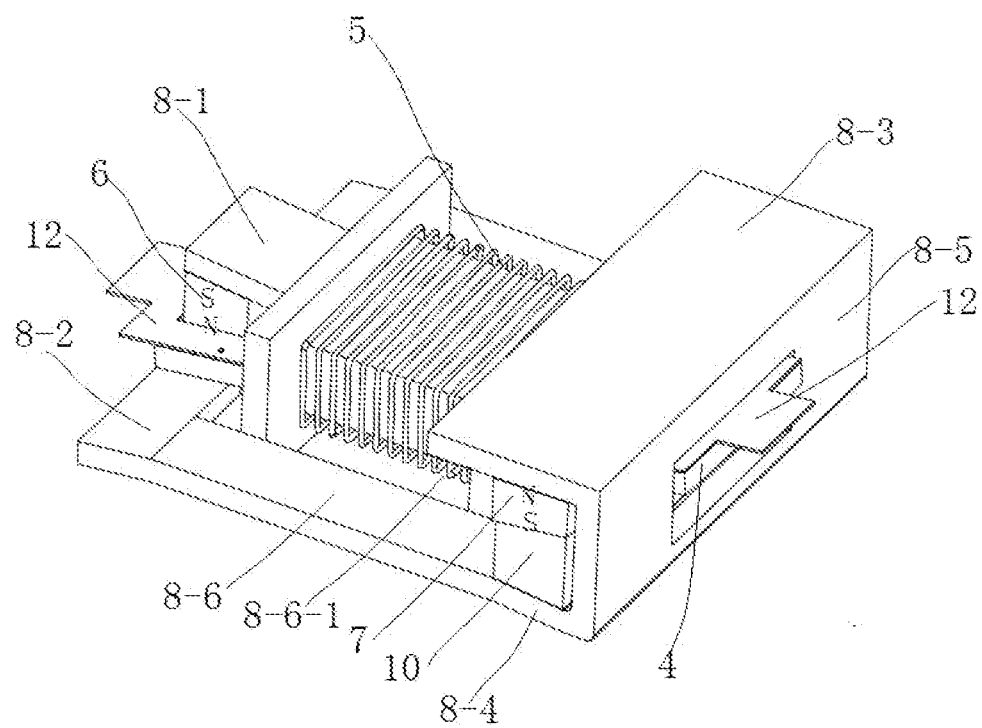
FIG. 8 is a three-dimensional diagram of Embodiment 4 of the apparatus for self-generating power with two magnets at two ends of the present disclosure.

With reference to FIG. 7 and FIG. 8, a basic structure of an apparatus for self-generating power with two magnets at two ends of this embodiment is the same as that of Embodiment 3, except that a toggle end at a right end of a soft magnetic plate 5 penetrates out of a first hole 8-5-1 on a first soft magnetic vertical plate 8-5, and the toggle end of the soft magnetic plate 5 is connected to a flat spring 12; and a toggle end at a left end of the soft magnetic plate 5 is designed as a U-shaped structure which may sleeve a permanent magnet, so as to drive the soft magnetic plate to rotate, wherein the U-shaped structure is connected to a flat spring 12.

Embodiment 5

Figure 9:
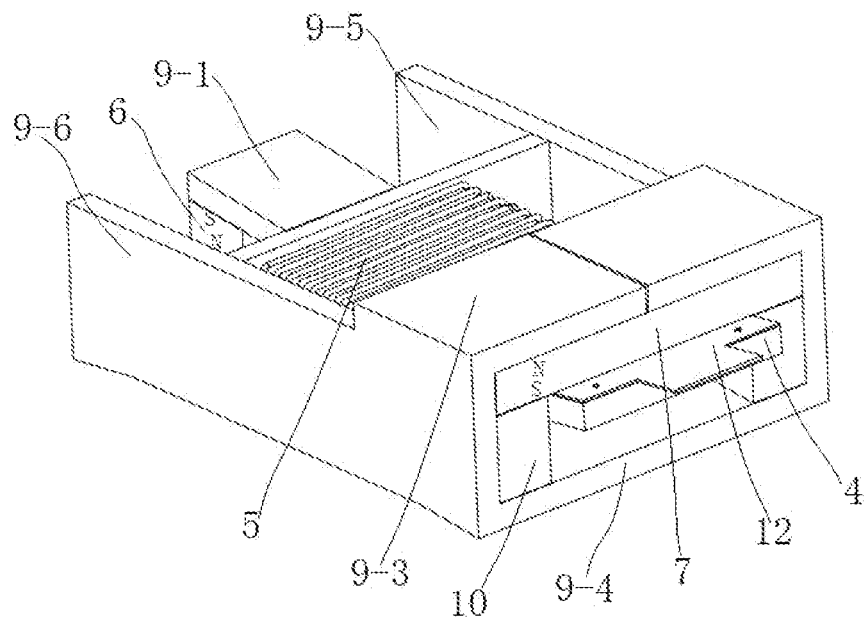
FIG. 9 is a three-dimensional diagram of Embodiment 5 of an apparatus for self-generating power with two magnets at two ends of the present disclosure.

With reference to FIG. 9, an apparatus for self-generating power with two magnets at two ends of this embodiment includes a coil assembly and a permanent magnet assembly. The permanent magnet assembly includes a second left permanent magnet 6, a second right permanent magnet 7 and a third soft magnetic frame. The third soft magnetic frame includes a third upper left soft magnetic plate 9-1, a third lower left soft magnetic plate 9-2, a third upper right soft magnetic plate 9-3 and a third lower right soft magnetic plate 9-4. A left end of the third upper left soft magnetic plate 9-1 and a left end of the third lower left soft magnetic plate 9-2 are attracted to an upper side surface and a lower side surface of the second left permanent magnet 6 respectively. A rear end of the third upper right soft magnetic plate 9-3 and a rear end of the third lower right soft magnetic plate 9-4 are both connected to a rear end of the third lower left soft magnetic plate 9-2 through a soft magnetic rear side plate 9-5 arranged vertically. And a front end of the third upper right soft magnetic plate 9-3 and a front end of the third lower right soft magnetic plate 9-4 are both connected to a front end of the third lower left soft magnetic plate 9-2 through a soft magnetic front side plate 9-6 arranged vertically. The second right permanent magnet 7 is attracted to a lower surface of the third upper right soft magnetic plate 9-3, and a support block 10 is arranged between each of a front end and a rear end of the second right permanent magnet 7 and an upper surface of the third upper right soft magnetic plate 9-3.

The coil assembly includes a coil 4 and a soft magnetic plate 5. The soft magnetic plate 5 is arranged in an up-down rotation manner, a left end of the soft magnetic plate 5 is located between a right end of the third upper left soft magnetic plate 9-1 and a right end of the third lower left soft magnetic plate 9-2, and a right end of the soft magnetic plate 5 is located between the second right permanent magnet 7 and the third lower right soft magnetic plate 9-4. The coil 4 is wound outside a middle of the soft magnetic plate 5. And at least one end of the left end and the right end of the soft magnetic plate 5 is a toggle end. In this embodiment, the toggle end at the right end of the soft magnetic plate 5 protrudes out of an annular structure defined by the third upper right soft magnetic plate 9-3, the third lower right soft magnetic plate 9-4, a right end of the soft magnetic front side plate 9-6 and a right end of the soft magnetic rear side plate 9-5. The toggle end at the right end of the soft magnetic plate 5 is connected to a flat spring 12.

In an initial state, the left end and the right end of the soft magnetic plate 5 come into contact with the third lower left soft magnetic plate 9-2 and the second right permanent magnet 7 respectively to form a fifth closed magnetic circuit. Specifically, in the fifth closed magnetic circuit, magnetic lines of force from an N-pole of the second right permanent magnet 7 passes through the third upper right soft magnetic plate 9-3, the soft magnetic front side plate 9-6 (the soft magnetic rear side plate 9-5), the third lower left soft magnetic plate 9-2 and the soft magnetic plate 5 to converge into an S-pole of the second right permanent magnet 7. In order to increase magnetic lines of force passing through the soft magnetic plate 5 and greatly increase power generation, a contact surface between the left end of the soft magnetic plate 5 and the third lower left soft magnetic plate 9-2 and a contact surface between the right end of the soft magnetic plate 5 and the second right permanent magnet 7 are both arranged obliquely with left lower than right. When the soft magnetic plate 5 rotates relative to the permanent magnet assembly, the left end and the right end of the soft magnetic plate 5 come into contact with the third upper left soft magnetic plate 9-1 and the third lower right soft magnetic plate 9-4 to form a sixth closed magnetic circuit. Specifically, in the sixth closed magnetic circuit, magnetic lines of force from an N-pole of the second left permanent magnet 6 sequentially passes through the third lower left soft magnetic plate 9-2, the soft magnetic front side plate 9-6 (the soft magnetic rear side plate 9-5), the third lower right soft magnetic plate 9-4, the soft magnetic plate 5 and the third upper left soft magnetic plate 9-1 to converge into an S-pole of the second left permanent magnet 6. In order to increase magnetic lines of force passing through the soft magnetic plate 5 and greatly increase power generation, a contact surface between the left end of the soft magnetic plate 5 and the third upper left soft magnetic plate 9-1 and a contact surface between the right end of the soft magnetic plate 5 and the third lower right soft magnetic plate 9-4 are both arranged obliquely with left higher than right. A direction of the magnetic line of force passing through the soft magnetic plate 5 in the fifth closed magnetic circuit is opposite to that of the magnetic line of force passing through the soft magnetic plate 5 in the sixth closed magnetic circuit. The direction of the magnetic line of force passing through the soft magnetic plate 5 is changed by controlling the soft magnetic plate 5 to rotate up and down relative to the permanent magnet assembly, and the coil generates power according to an electromagnetic induction principle. Since the closed magnetic circuit is formed, the magnetic flux passing through the coil is maximized, power generation efficiency is high, current is strong, and power is sufficient. In addition, since the soft magnetic plate 5 is located between the left permanent magnet 6 and the second right permanent magnet 7, and the both ends of the soft magnetic plate 5 are close to the permanent magnet, such that the soft magnetic plate 5 is more easily magnetic-conductive, and the magnetic line of force in the closed magnetic circuit may more easily pass through the soft magnetic plate 5. In addition, the permanent magnet assembly and the coil assembly themselves are composed of few components, and the closed magnetic circuit formed by the permanent magnet assembly and the coil assembly in cooperation is simple and quick to manufacture, thereby greatly improving production efficiency and reduces a manufacturing cost.

Figure 10:
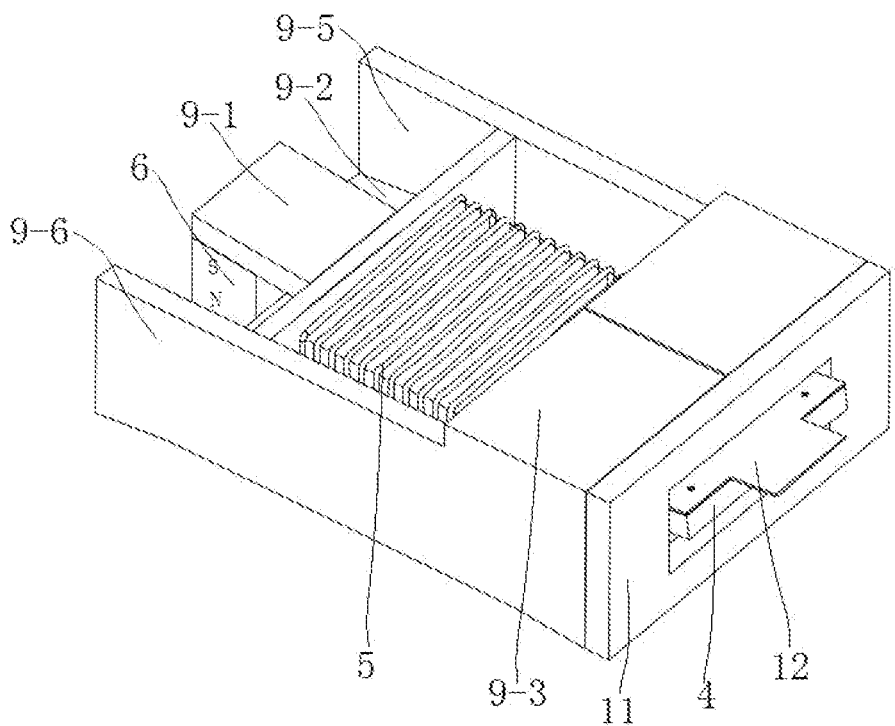
FIG. 10 is a three-dimensional diagram of Embodiment 5, with a second soft magnetic vertical plate additionally arranged, of the apparatus for self-generating power with two magnets at two ends of the present disclosure.

With reference to FIG. 10, in order to increase a magnetic conductive circuit, the permanent magnet assembly further includes a second soft magnetic vertical plate 11. A left end surface of the second soft magnetic vertical plate 11 is attracted to a right end surface of the second right permanent magnet 7, and a periphery of the left end surface of the second soft magnetic vertical plate 11 separately comes into contact with a right end surface of the third upper left soft magnetic plate 9-1, a right end surface of the third lower right soft magnetic plate 9-4, a right end surface of the soft magnetic rear side plate 9-5 and a right end surface of the soft magnetic front side plate 9-6, such that magnetic lines of force emitted by the N-pole of the second right permanent magnet 7 may sequentially pass through the third upper right soft magnetic plate 9-3, the second soft magnetic vertical plate 11, the soft magnetic front side plate 9-6 (the soft magnetic rear side plate 9-5), the third lower left soft magnetic plate 9-2 and the soft magnetic plate 5 to converge into the S-pole of the second right permanent magnet 7, which further increases the magnetic lines of force passing through the soft magnetic plate 5, and improves the power generation efficiency, so as to supply more power.

In this embodiment, for the convenience of manufacturing, the third upper right soft magnetic plate 9-3, the soft magnetic front side plate 9-6, the soft magnetic rear side plate 9-5, the third lower left soft magnetic plate 9-2 and the third lower right soft magnetic plate 9-4 are of an integrated structure. That is, a soft magnetic plate is cut first, then an opening for the coil to be wound more turns is machined on the soft magnetic plate, then side edges located on a front side and a rear side of the opening on the soft magnetic plate are both bent upwards to form the soft magnetic front side plate 9-6 and the soft magnetic rear side plate 9-5 respectively, the third upper right soft magnetic plate 9-3 is formed by a section extending upwards and bent backwards on an upper surface of the right end of the soft magnetic front side plate 9-6 and a section extending upwards and bent forwards on an upper surface of the right end of the soft magnetic rear side plate 9-5, and then, side edges located on a left side and a right side of the opening on the soft magnetic plate are both punched to form the third lower left soft magnetic plate 9-2 which is arranged obliquely with left lower than right and the third lower right soft magnetic plate 9-4 which is arranged obliquely with left higher than right respectively.

A wireless switch of this embodiment includes a radio frequency control board, a switch body used for controlling an electric device, and the apparatus for self-generating power described above, wherein the coil 4 of the apparatus for self-generating power is electrically connected to the radio frequency control board, and the coil in the apparatus for self-generating power generates currents to supply power to the radio frequency control board, thereby realizing passive wireless switch control.

Embodiment 6

Figure 11:
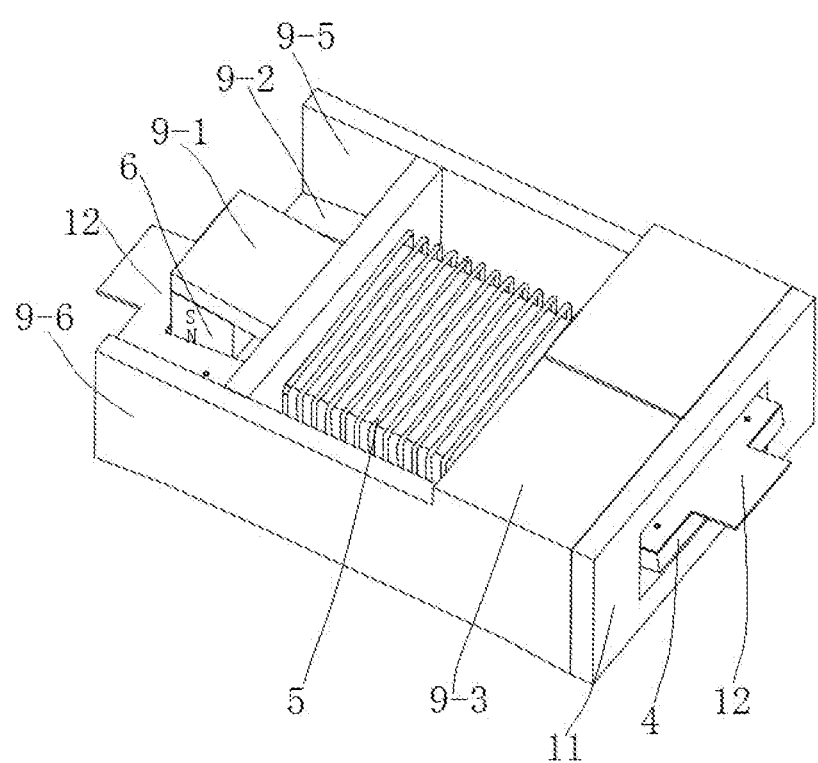
FIG. 11 is a three-dimensional diagram of Embodiment 6 of an apparatus for self-generating power with two magnets at two ends of the present disclosure.

With reference to FIG. 11, a basic structure of an apparatus for self-generating power with two magnets at two ends of this embodiment is the same as that of Embodiment 5, except that a toggle end at a right end of a soft magnetic plate 5 penetrates out of an annular structure defined by a third upper right soft magnetic plate 9-3, a third lower right soft magnetic plate 9-4, a right end of a soft magnetic front side plate 9-6 and a right end of a soft magnetic rear side plate 9-5, and a first hole on a second soft magnetic vertical plate 11, wherein the toggle end of the soft magnetic plate 5 is connected to a flat spring 12; and a toggle end at a left end of the soft magnetic plate 5 is designed as a U-shaped structure which may sleeve a permanent magnet, so as to drive the soft magnetic plate to rotate, wherein the U-shaped structure is connected to a flat spring 12.

According to an apparatus for self-generating power with two magnets at two ends and a wireless switch using same of the present disclosure, the direction of the magnetic line of force passing through the soft magnetic plate is changed by controlling the soft magnetic plate to rotate up and down relative to the permanent magnet assembly, and the coil generates power according to the electromagnetic induction principle. Since the closed magnetic circuit is formed, the magnetic flux passing through the coil is maximized, and in addition, since the soft magnetic plate is located between the left permanent magnet and the right permanent magnet, and both ends of the soft magnetic plate are close to the permanent magnet, such that the soft magnetic plate is more easily magnetic-conductive, the magnetic line of force in the closed magnetic circuit may more easily pass through the soft magnetic plate, and therefore power generation efficiency is high, current is strong, and power is sufficient.

The above schematic description of the present disclosure and its embodiments is not restrictive. What is shown in the accompanying drawings is merely one of the embodiments of the present disclosure, and an actual structure is not limited thereto. Therefore, structural manners and embodiments, similar to the technical solution, designed without creative efforts by a person of ordinary skill in the art under inspiration by such embodiments without departing from the creative purposes of the present disclosure shall fall within the protection scope of present disclosure.

What is claimed is:

1. An apparatus for self-generating power with two magnets at two ends, comprising a coil assembly and a permanent magnet assembly, wherein the permanent magnet assembly comprises a first left permanent magnet, a first right permanent magnet and a first soft magnetic frame, wherein the first soft magnetic frame comprises a first upper left soft magnetic plate, a first lower left soft magnetic plate, a first upper right soft magnetic plate and a first lower right soft magnetic plate, the first left permanent magnet and the first right permanent magnet are bilaterally oppositely arranged, a left end of the first upper left soft magnetic plate and a left end of the first lower left soft magnetic plate are attracted to an upper side surface and a lower side surface of the first left permanent magnet respectively, a right end of the first upper right soft magnetic plate and a right end of the first lower right soft magnetic plate are attracted to an upper side surface and a lower side surface of the first right permanent magnet respectively, and the first lower left soft magnetic plate and the first lower right soft magnetic plate are connected through a first soft magnetic base plate, wherein the first soft magnetic base plate is optionally provided with a first opening for a coil to be wound more turns;

the coil assembly comprises a coil and a soft magnetic plate, wherein the soft magnetic plate is arranged between the first left permanent magnet and the first right permanent magnet in an up-down rotation manner, a left end of the soft magnetic plate is located between a right end of the first upper left soft magnetic plate and a right end of the first lower left soft magnetic plate, a right end of the soft magnetic plate is located between a left end of the first upper right soft magnetic plate and a left end of the first lower right soft magnetic plate, the coil is wound outside a middle of the soft magnetic plate, and at least one end of the left end and the right end of the soft magnetic plate is a toggle end; and in an initial state, the left end and the right end of the soft magnetic plate come into contact with the first lower left soft magnetic plate and the first upper right soft magnetic plate respectively to form a first closed magnetic circuit, when the soft magnetic plate rotates relative to the permanent magnet assembly, the left end and the right end of the soft magnetic plate come into contact with the first upper left soft magnetic plate and the first lower right soft magnetic plate to form a second closed magnetic circuit, and a direction of a magnetic line of force passing through the soft magnetic plate in the first closed magnetic circuit is opposite to that of a magnetic line of force passing through the soft magnetic plate in the second closed magnetic circuit.

2. The apparatus for self-generating power with two magnets at two ends according to claim 1, wherein a contact surface between the left end of the soft magnetic plate and the first upper left soft magnetic plate and a contact surface between the right end of the soft magnetic plate and the first lower right soft magnetic plate are both arranged obliquely with left higher than right, and a contact surface between the left end of the soft magnetic plate and the first lower left soft magnetic plate and a contact surface between the right end of the soft magnetic plate and the first upper right soft magnetic plate are both arranged obliquely with left lower than right.

3. The apparatus for self-generating power with two magnets at two ends according to claim 1, wherein a front side edge and a rear side edge of the first soft magnetic base plate, a front end and a rear end of the first lower left soft magnetic plate and a front end and a rear end of the first lower right soft magnetic plate are all bent upwards.

4. An apparatus for self-generating power with two magnets at two ends, comprising a coil assembly and a permanent magnet assembly, wherein the permanent magnet assembly comprises a second left permanent magnet, a second right permanent magnet and a second soft magnetic frame, wherein the second soft magnetic frame comprises a second upper left soft magnetic plate, a second lower left soft magnetic plate, a second upper right soft magnetic plate and a second lower right soft magnetic plate, a left end of the second upper left soft magnetic plate and a left end of the second lower left soft magnetic plate are attracted to an upper side surface and a lower side surface of the second left permanent magnet respectively, a right end of the second upper right soft magnetic plate and a right end of the second lower right soft magnetic plate are connected through a first soft magnetic vertical plate, the second lower right soft magnetic plate and the second lower left soft magnetic plate are connected through a second soft magnetic base plate, and the second right permanent magnet is attracted to a lower surface of the second upper right soft magnetic plate, and a support block is arranged between each of a front end and a rear end of the second right permanent magnet and an upper surface of the second lower right soft magnetic plate; wherein the second soft magnetic base plate is optionally provided with a second opening for a coil to be wound more turns;

the coil assembly comprises the coil and a soft magnetic plate, wherein the soft magnetic plate is arranged in an up-down rotation manner, a left end of the soft magnetic plate is located between a right end of the second upper left soft magnetic plate and a right end of the second lower left soft magnetic plate, a right end of the soft magnetic plate is located between the second right permanent magnet and the second lower right soft magnetic plate, the coil is wound outside a middle of the soft magnetic plate, and at least one end of the left end and the right end of the soft magnetic plate is a toggle end; and in an initial state, the left end and the right end of the soft magnetic plate come into contact with the second lower left soft magnetic plate and the second right permanent magnet respectively to form a third closed magnetic circuit, when the soft magnetic plate rotates relative to the permanent magnet assembly, the left end and the right end of the soft magnetic plate come into contact with the second upper left soft magnetic plate and the second lower right soft magnetic plate to form a fourth closed magnetic circuit, and a direction of a magnetic line of force passing through the soft magnetic plate in the third closed magnetic circuit is opposite to that of a magnetic line of force passing through the soft magnetic plate in the fourth closed magnetic circuit.

5. The apparatus for self-generating power with two magnets at two ends according to claim 4, wherein a contact surface between the left end of the soft magnetic plate and the second upper left soft magnetic plate and a contact surface between the right end of the soft magnetic plate and the second lower right soft magnetic plate are both arranged obliquely with left higher than right, and a contact surface between the left end of the soft magnetic plate and the second lower left soft magnetic plate and a contact surface between the right end of the soft magnetic plate and the second right permanent magnet are both arranged obliquely with left lower than right.

6. An apparatus for self-generating power with two magnets at two ends, comprising a coil assembly and a permanent magnet assembly, wherein the permanent magnet assembly comprises a second left permanent magnet, a second right permanent magnet and a third soft magnetic frame, wherein the third soft magnetic frame comprises a third upper left soft magnetic plate a third lower left soft magnetic plate, a third upper right soft magnetic plate and a third lower right soft magnetic plate, a left end of the third upper left soft magnetic plate and a left end of the third lower left soft magnetic plate are attracted to an upper side surface and a lower side surface of the second left permanent magnet respectively, a rear end of the third upper right soft magnetic plate and a rear end of the third lower right soft magnetic plate are both connected to a rear end of the third lower left soft magnetic plate through a soft magnetic rear side plate arranged vertically, a front end of the third upper right soft magnetic plate and a front end of the third lower right soft magnetic plate are both connected to a front end of the third lower left soft magnetic plate through a soft magnetic front side plate arranged vertically, and the second right permanent magnet is attracted to a lower surface of the third upper right soft magnetic plate, and a support block is arranged between each of a front end and a rear end of the second right permanent magnet and an upper surface of the third upper right soft magnetic plate;

the coil assembly comprises a coil and a soft magnetic plate, wherein the soft magnetic plate is arranged in an up-down rotation manner, a left end of the soft magnetic plate is located between a right end of the third upper left soft magnetic plate and a right end of the third lower left soft magnetic plate, a right end of the soft magnetic plate is located between the second right permanent magnet and the third lower right soft magnetic plate, the coil is wound outside a middle of the soft magnetic plate, and at least one end of the left end and the right end of the soft magnetic plate is a toggle end; and in an initial state, the left end and the right end of the soft magnetic plate come into contact with the third lower left soft magnetic plate and the second right permanent magnet respectively to form a fifth closed magnetic circuit, when the soft magnetic plate rotates relative to the permanent magnet assembly, the left end and the right end of the soft magnetic plate come into contact with the third upper left soft magnetic plate and the third lower right soft magnetic plate to form a sixth closed magnetic circuit, and a direction of a magnetic line of force passing through the soft magnetic plate in the fifth closed magnetic circuit is opposite to that of a magnetic line of force passing through the soft magnetic plate in the sixth closed magnetic circuit.

7. The apparatus for self-generating power with two magnets at two ends according to claim 6, wherein a contact surface between the left end of the soft magnetic plate and the third upper left soft magnetic plate and a contact surface between the right end of the soft magnetic plate and the third lower right soft magnetic plate are both arranged obliquely with left higher than right, and a contact surface between the left end of the soft magnetic plate and the third lower left soft magnetic plate and a contact surface between the right end of the soft magnetic plate and the second right permanent magnet are both arranged obliquely with left lower than right.

8. The apparatus for self-generating power with two magnets at two ends according to claim 7, wherein the permanent magnet assembly further comprises a second soft magnetic vertical plate; a left end surface of the second soft magnetic vertical plate is attracted to a right end surface of the second right permanent magnet, and a periphery of the left end surface of the second soft magnetic vertical plate separately comes into contact with a right end surface of the third upper right soft magnetic plate a right end surface of the third lower right soft magnetic plate, a right end surface of the soft magnetic rear side plate and a right end surface of the soft magnetic front side plate.

9. A wireless switch, comprising a radio frequency control board, a switch body used for controlling an electric device, and the apparatus for self-generating power of claim 1, wherein the coil of the apparatus for self-generating power is electrically connected to the radio frequency control board.

10. A wireless switch, comprising a radio frequency control board, a switch body used for controlling an electric device, and the apparatus for self-generating power of claim 2, wherein the coil of the apparatus for self-generating power is electrically connected to the radio frequency control board.

11. A wireless switch, comprising a radio frequency control board, a switch body used for controlling an electric device, and the apparatus for self-generating power of claim 3, wherein the coil of the apparatus for self-generating power is electrically connected to the radio frequency control board.

12. A wireless switch, comprising a radio frequency control board, a switch body used for controlling an electric device, and the apparatus for self-generating power of claim 4, wherein the coil of the apparatus for self-generating power is electrically connected to the radio frequency control board.

13. A wireless switch, comprising a radio frequency control board, a switch body used for controlling an electric device, and the apparatus for self-generating power of claim 5, wherein the coil of the apparatus for self-generating power is electrically connected to the radio frequency control board.

14. A wireless switch, comprising a radio frequency control board, a switch body used for controlling an electric device, and the apparatus for self-generating power of claim 6, wherein the coil of the apparatus for self-generating power is electrically connected to the radio frequency control board.

15. A wireless switch, comprising a radio frequency control board, a switch body used for controlling an electric device, and the apparatus for self-generating power of claim 7, wherein the coil of the apparatus for self-generating power is electrically connected to the radio frequency control board.

16. A wireless switch, comprising a radio frequency control board, a switch body used for controlling an electric device, and the apparatus for self-generating power of claim 8, wherein the coil of the apparatus for self-generating power is electrically connected to the radio frequency control board.

17. A wireless switch, comprising a radio frequency control board, a switch body used for controlling an electric device, and the apparatus for self-generating power of claim 9, wherein the coil of the apparatus for self-generating power is electrically connected to the radio frequency control board.

18. The apparatus for self-generating power with two magnets at two ends according to claim 2, wherein a front side edge and a rear side edge of the first soft magnetic base plate, a front end and a rear end of the first lower left soft magnetic plate and a front end and a rear end of the first lower right soft magnetic plate are all bent upwards.

* * * * *